United States Patent [19]
Lee et al.

[11] Patent Number: 5,805,910
[45] Date of Patent: Sep. 8, 1998

[54] COMPUTER HIBERNATION SYSTEM FOR TRANSMITTING DATA AND COMMAND WORDS BETWEEN HOST AND CONTROLLER

[75] Inventors: Chang-ho Lee; Shung-hyun Cho, both of Kyungki-do; Noh-byung Park, Seoul, all of Rep. of Korea

[73] Assignee: Samsung Electronics Co., Ltd., Kyungki-do, Rep. of Korea

[21] Appl. No.: 621,948

[22] Filed: Mar. 25, 1996

[30] Foreign Application Priority Data

Mar. 28, 1995 [KR] Rep. of Korea ......................... 95-6759
Dec. 20, 1995 [KR] Rep. of Korea ....................... 95-52853

[51] Int. Cl.[6] ................................. G06F 1/26; G06F 1/32
[52] U.S. Cl. ................................ 395/750.05; 395/750.06; 395/182.12; 395/182.2; 364/707; 364/492; 307/66
[58] Field of Search ..................................... 395/750, 800, 395/733, 182.2, 182.12, 750.05, 750.06, 750.08, 750.01; 364/707, 492, 483; 307/65, 66; 365/226–229

[56] References Cited

U.S. PATENT DOCUMENTS

| | | | |
|---|---|---|---|
| 4,747,041 | 5/1988 | Engel et al. .............................. | 395/750 |
| 5,163,124 | 11/1992 | Yabe et al. ............................... | 395/750 |
| 5,222,231 | 6/1993 | Gunji ....................................... | 395/575 |
| 5,300,874 | 4/1994 | Shimamoto et al. ...................... | 320/15 |
| 5,339,437 | 8/1994 | Yuen ....................................... | 395/734 |
| 5,384,721 | 1/1995 | Joto ........................................ | 364/707 |
| 5,410,713 | 4/1995 | White et al. ............................. | 395/750 |
| 5,450,003 | 9/1995 | Cheon ..................................... | 323/272 |
| 5,477,476 | 12/1995 | Schanin et al. .......................... | 364/707 |
| 5,483,464 | 1/1996 | Song ...................................... | 364/492 |
| 5,485,623 | 1/1996 | Kuro Kawa et al. ................. | 395/182.2 |
| 5,511,204 | 4/1996 | Crump et al. ........................... | 395/750 |
| 5,513,359 | 4/1996 | Clark et al. ............................. | 395/750 |
| 5,530,879 | 6/1996 | Crump et al. ........................... | 395/750 |
| 5,542,035 | 7/1996 | Kikinis et al. .......................... | 395/750 |
| 5,548,763 | 8/1996 | Combs et al. .......................... | 395/750 |

*Primary Examiner*—Gopal C. Ray
*Attorney, Agent, or Firm*—Robert E. Bushnell, Esq.

[57] ABSTRACT

A computer system includes: a host unit, a power management system, a data backup power supply, a switching mode power supply, an auxiliary storage unit and a memory. The power management system generates a hibernation signal when an event is not generated from peripheral devices for a predetermined time period, a battery driving signal is output from the data backup power supply due to a power-off operation, or a command word is generated in accordance with performing a scheduled program. The host unit backs up the current operational environment and data in the auxiliary memory storage unit according to the hibernation signal, and outputs a powerdown command word so that the power management system interrupts the system power supply by outputting a main power cut-off signal or outputting a battery power cut-off signal according to the powerdown command word. The power management system resumes the power supply by outputting a power supply signal when a WAKE-UP signal in generated while the power is interrupted. When power is resumed, the host unit retrieves the backed up data and the work environment, identifies the source outputting the WAKE-UP signal, and then performs the corresponding operation.

12 Claims, 6 Drawing Sheets

COMPUTER HIBERNATION SYSTEM FOR TRANSMITTING DATA AND COMMAND WORDS BETWEEN HOST AND CONTROLLER

CLAIM OF PRIORITY

This application makes reference to, incorporates the same herein, and claims all benefits accruing under 35 U.S.C. §119 arising from applications for Computer System And Control Method Therefor earlier filed in the Korean Industrial Property Office on 28 Mar. 1995 and 20 Dec. 1995 and there duly assigned Ser. No. 6759/1995 and 52853/1995, respectively.

BACKGROUND OF THE INVENTION

The present invention relates to a computer hibernation system, and more particularly, to a computer system that enables transmission of data and command words between a host unit and an interface controller so that the computer system can identify a source requiring a wake up operation while in a hibernation state, and control various operations of the computer system while in the hibernation state.

With the progression of computer technology, power saving functions of computers have been greatly improved.

Conventional personal computers often provide a power saving function by using power saving elements and a power management system (PMS). Computers are also constructed to provide a hibernation mode in which power is interrupted and a current input/output state of the computer system is stored in a predetermined area of a hard disk when system activity is not provided for a predetermined period of time.

A desirable hibernation system includes a function in that when electrical power is interrupted through either a sudden power failure, or a user's mistake, the computer stores the present operating condition of the computer in an auxiliary storage unit, such as a hard disk, and, once power is turned back on, restores the computer's memory to the state before power was interrupted. Another desirable function is that when a user does not use the computer for a predetermined time period, the hibernation system automatically interrupts the power while storing the present operating condition in the auxiliary storage unit. In this manner, electrical power is conserved until work is resumed by restoring the computer's memory and operating condition to the state prior to power interruption when the user turns on the power again.

Among users of personal computers, hibernation systems equipped with automatic retrieving functions for emergency or power saving use are increasingly popular.

U.S. Pat. No. 5,585,677 issued in the U.S. Patent & Trademark Office on Dec. 17, 1996 relates to an auxiliary power source for backing up a work environment in an emergency situation. Korean Patent Application No. 94-13919 filed in the U.S. Patent & Trademark Office on Jun. 20, 1995 and there assigned Ser. No. 08/492,492 relates to a stop clock control system and method thereof. Korean Patent Application No. 93-3116 filed in the Korean Industrial Property Office on Mar. 4, 1993 (not filed in U.S.) relates to a power supply control system for peripheral equipment of a computer, and U.S. Pat. No. 5,486,756 issued in the U.S. Patent & Trademark Office on Jan. 23, 1996 relates to a power cut-off generating circuit for peripheral equipment of a computer.

These conventional hibernation systems, however, reduce the supply of power below certain voltages when the computer does not receive a user input for a predetermined time period. Therefore, the user must turn on the power switch twice to again supply electrical power and restore their work to its previous condition, that is, wake-up the system again. This creates inconvenience in operating the computer.

Therefore, to solve the aforementioned inconvenience in operating the power switch, a product having an additional function that enables a system wake-up operation without operating the power switch has been manufactured in the first half of 1995.

Within the product, the system is intended to be awakened by a key input, a ring signal from a facsimile or a modem, in addition to the power switch. Related art includes Korean Application No. 94-35953, filed in the U.S. Patent & Trademark Office on Dec. 22, 1994, which relates to a peripheral device input-initiated resume system combining a hibernation system and a back-up power supply for the computer. The system can retrieve the previous work again by cutting off power to all devices, supplying the additional power only to a MICOM or keyboard controller, and then resuming the power supply if a key input is again provided by a user, in the state that a hibernation mode is performed. This hibernation system, however, has some limitations in determining a source initiating the wake-up operation, namely, a peripheral device that outputs a wake-up signal, and can not qualify or mask the requirement of waking-up in accordance with each source. In addition, conventional hibernation systems can not freely apply the hibernation mode according to the convenience of the user.

SUMMARY OF THE INVENTION

Therefore, it is an object of the present invention to provide an improved hibernation system is for a computer.

It is another object to provide a computer system that enables transmission of data and command words between a host and an interface controller.

It is still another object to provide a computer system that can identify a source requiring a wake up operation when in a hibernation state of the system.

It is yet another object to provide a computer system that enables a user to manually activate a hibernation state of the system.

It is still yet another object to provide a computer system that activates a hibernation state of the system when no system activity has occurred for a predetermined period of time.

It is a further object to provide a computer system that activates a hibernation state of the system according to a scheduled hibernation operation.

It is still a further object to provide a computer system that stores a current hardware and memory condition of the system when performing a hibernation operation.

It is yet a further object to provide a computer system that retrieves a previous hardware and memory condition of the system when system operation is resumed from a hibernation state.

To achieve these and other objects, the present invention may be constructed with: a host unit, a power management system, a data backup power supply, a switching mode power supply, an auxiliary storage unit and a memory. The power management system generates a hibernation signal when an event is not generated from peripheral devices for a predetermined time period, a battery driving signal is output from the data backup power supply due to a power-off operation, or a command word is generated in accordance with performing a scheduled program. The host unit backs up the current operational environment and data in the auxiliary memory storage unit according to the hibernation signal, and outputs a powerdown command word so that the power management system interrupts the supply of electrical power to the system by outputting a main power cut-off signal or outputting a battery power cut-off signal in accordance with the powerdown command word. The power management system resumes the power supply by outputting a power supply signal when a WAKE-UP signal is generated during the interruption of electrical power. When the supply of electrical power is resumed, the host unit retrieves the backed up data and the work environment, identifies the source outputting the WAKE-UP signal, and then performs an operation in correspondence with the requirements of the source providing the WAKE-UP signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
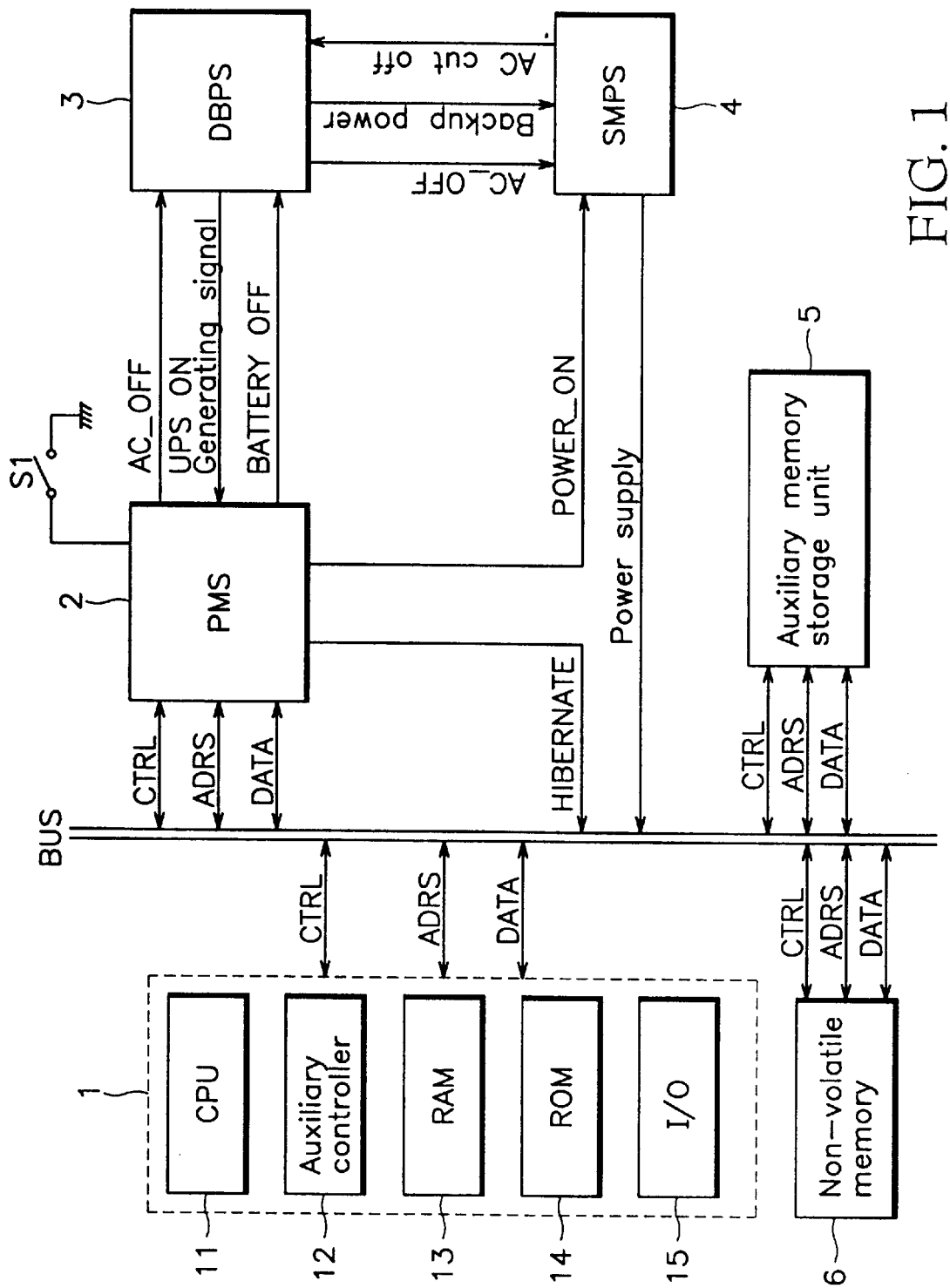
FIG. 1 is a diagram of the computer system constructed according to a preferred embodiment of the present invention.

Turning now to the drawings and referring to FIG. 1, a diagram of the computer system constructed according to a preferred embodiment of the present invention is shown. The computer system shown in FIG. 1 includes: a host unit 1, a power management system 2 (hereinafter, PMS) connected to a bus, a data backup power supply 3 (hereinafter, DBPS) connected to the bus, a switching mode power supply 4 (hereinafter, SMPS), an auxiliary memory storage unit 5, a non-volatile memory 6 and a hibernation switch S1.

Host unit 1 represents a main processing unit of the system, and includes a central processing unit (hereinafter, CPU) 11, an auxiliary controller 12, a random access memory (hereinafter, RAM) 13, a read-only memory (hereinafter, ROM) 14, and an input/output unit 15. Auxiliary controller 12 denotes components, such as a bus controller, a direct memory access controller and an interrupt controller.

Figure 2:
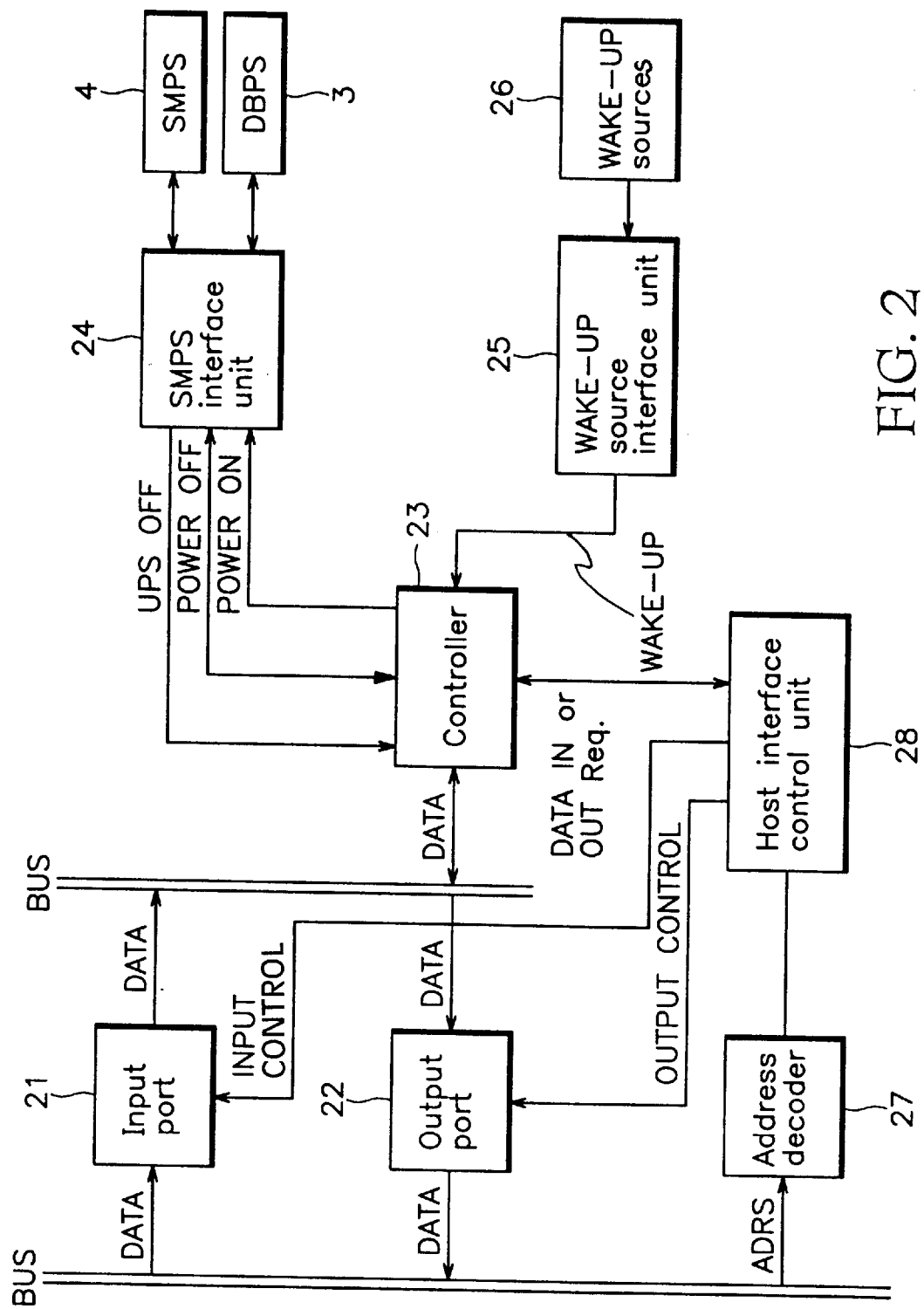
FIG. 2 is a diagram of the power management system of the computer system constructed according to a preferred embodiment of the present invention.

Referring now to FIG. 2, PMS 2 has: an input port 21 connected to the bus, an output port 22 connected to the bus, a controller 23 connected to an inner data bus, an SMPS interface unit 24 connected to controller 23, a WAKE-UP source interface unit 25 connected to controller 23, a plurality of WAKE-UP sources 26 connected to WAKE-UP source interface unit 25, an address decoder 27 connected to the bus, and a host interface unit 28 connected to address decoder 27 and controller 23.

Controller 23 includes a timer that begins operation simultaneously with the beginning of hibernation for counting a designated time period. When the designated time period passes, the timer outputs a corresponding signal in order to wake-up the system. The timer counts the designated time period to perform a program in accordance with a scheduling operation.

WAKE-UP source interface unit 25 is connected with the plurality of WAKE-UP sources 26, such as a keyboard, a facsimile and a modem, and outputs a WAKE-UP signal while in the hibernation state.

SMPS interface unit 24, which is installed within SMPS 4, performs signal transmission among controller 23, SMPS 4 and DBPS 3, and prevents malfunctions attributable to noise or data errors.

In the preferred embodiment of the present invention, the transmission of data between host unit 1 and controller 23 is enabled by input port 21 and output port 22. Commandwords, various data and protocol are utilized by controller 23.

In addition, host interface unit 28 and address decoder 27 are installed in order to control the input and output of data to and from host unit 1. The present invention also enables a user to perform hibernation manually according to the user's activation of hibernation switch S1.

The computer used for the preferred embodiment of the present invention is a general computer structured according to the Von Neuman method. Even though this preferred embodiment will be implemented in general computers, the present invention can also be applied to personal computers.

Figure 3A:
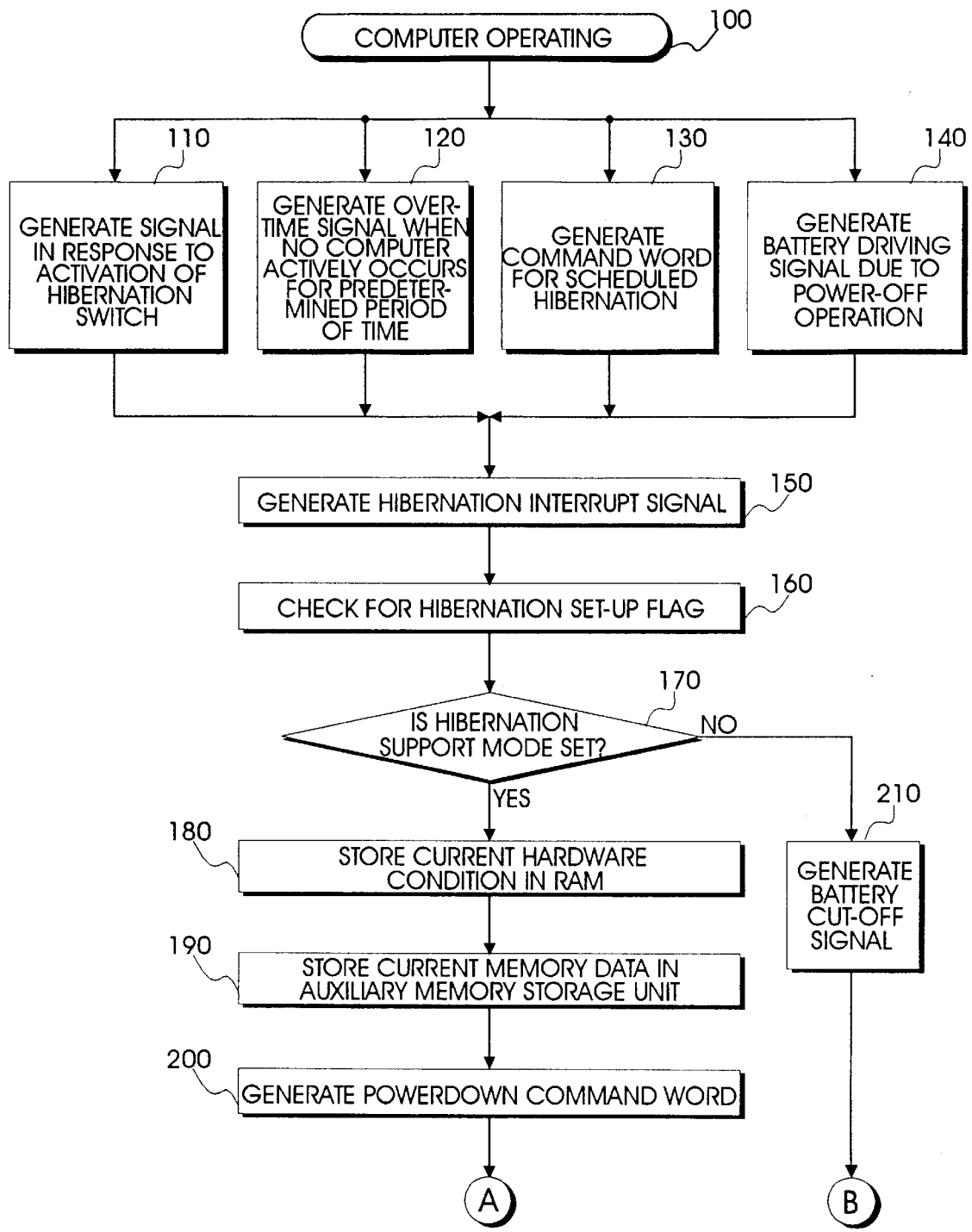
FIGS. 3A and 3B are operational flowcharts showing a suspend process of the computer system performed according to a preferred embodiment of the present invention.
Figure 3B:
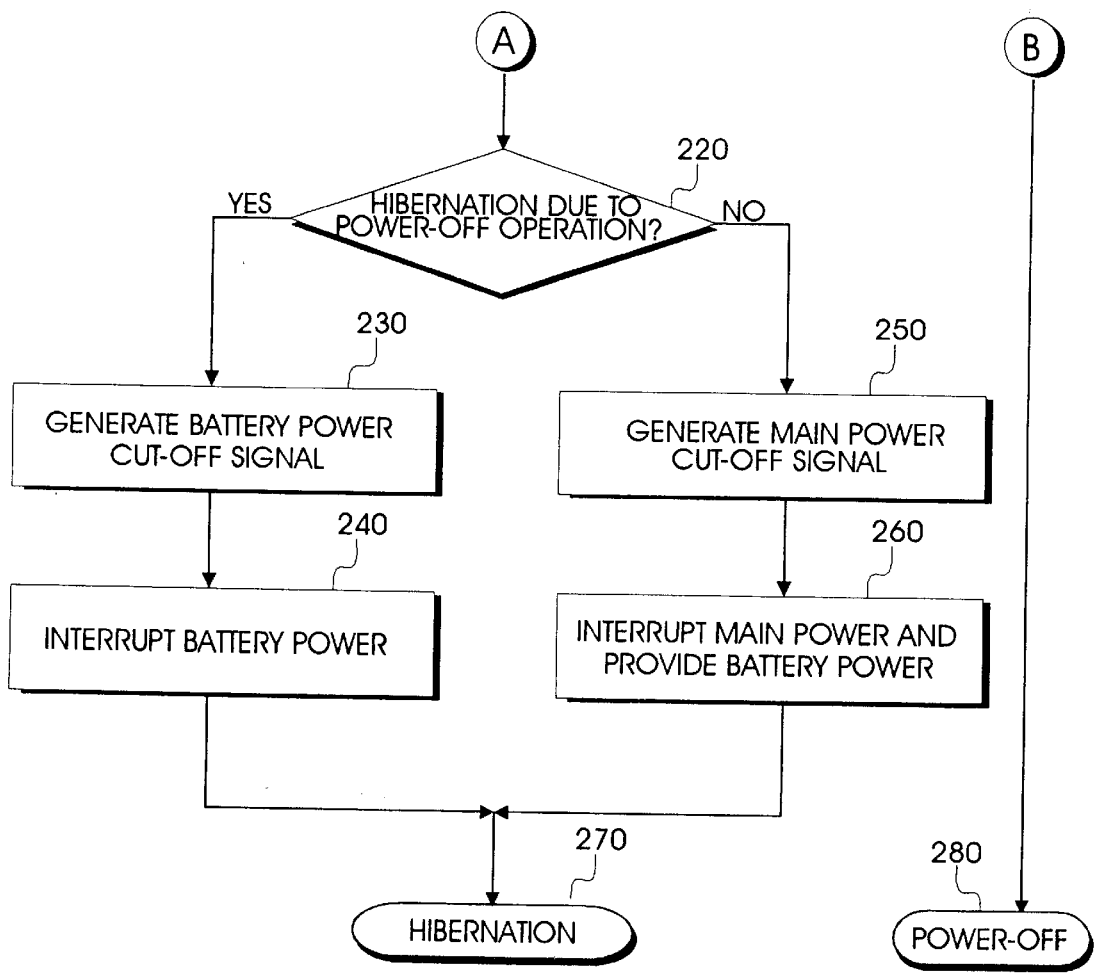

A suspend process of the computer system constructed according to the preferred embodiment of the present invention will now be described with reference to FIGS. 3A and 3B.

In step 100, the computer is maintained in an operating state. While the computer is operating, a user can manually activate hibernation switch S1 to initiate computer hibernation for the reason that he or she is attending to other jobs, or is simply leaving the presence of the computer. In response to activation of hibernation switch S1, a signal is generated and input to controller 23 of PMS 2, in step 110.

If, while the computer is operating in step 100, there is no computer activity, such as an input from the keyboard or mouse, or operation of the hard disk drive or floppy disk drive, for a predetermined period of time, host unit 1 generates and outputs an overtime signal, in step 120.

Also while the computer is operating in step 100, a command word for initiating a scheduled hibernation can be provided to controller 23, in step 130. Here, the user defines the designated time period during which hibernation will occur, and further defines a scheduled program to be performed after the designated time period elapses. The designated time period is written into the timer of controller 23, and a flag representative of the scheduled program to be performed is stored in non-volatile memory 6. The command word is generated and the computer system hibernates until the designated time period elapses. Then, the computer is automatically woken up, and the scheduled program is performed after checking the flag stored in non-volatile memory 6.

Alternatively, if externally supplied power is cut off because of a sudden power-off operation while the computer is operating in step 100, DBPS 3 exchanges the external AC power with a battery power source, and provides a battery driving signal UPS ON to controller 23, in step 140.

As described above, while the computer is operating in step 100, if either: (1) hibernation switch S1 is operated by a user in step 110, (2) the overtime signal is generated because no computer activity occurs for a predetermined period of time in step 120, (3) a command word is generated to execute a scheduled hibernation in step 130, or (4) the battery driving signal UPSON is generated due to a sudden power-off operation in step 140, controller 23 of PMS 2 generates and outputs a hibernation interrupt signal HIBERNATE, in step 150.

Hibernation interrupt signal HIBERNATE is input via the system bus to CPU 11 of host unit 1 by host interface control unit 28. In response to input of the hibernation interrupt signal HIBERNATE, CPU 11 of host unit 1 invokes a hibernation service routine. In step 160, CPU 11 checks for a hibernation setup flag stored in non-volatile memory 6. Then, based on step 160, CPU 11 determines whether a hibernation support mode is currently set, in step 170.

Generally, the hibernation service routine can be included in the Basic Input Output System (hereinafter, BIOS) stored in ROM 14 in the case of a personal computer, and can be included in a kernel of the operating system in the case of a multi-task operating system.

When it is determined that the hibernation support mode is set, CPU 11 stores the current hardware condition of the computer in a working area for the hibernation service routine, in step 180. That is, the current working states of CPU 11, auxiliary controller 12 and the BIOS are stored in RAM 13. Next, in step 190, data from all memories in the computer is stored in auxiliary memory storage unit 5. In step 200, CPU 11 outputs a powerdown command word to PMS 2.

In response to step 200, address decoder 27 of PMS 2 decodes the address applied according to the powerdown command word of host unit 1, and outputs a corresponding latch enabling signal. Host interface control unit 28 enables input port 21 according to the latch enabling signal, and simultaneously outputs a data input request signal to controller 23.

Input port 21 latches the powerdown command word output to the system bus in accordance with the latch enabling signal, and controller 23 reads the powerdown command word latched to input port 21 in accordance with the data input request signal provided from host interface control unit 28.

In the above description, after the powerdown command word is output from host unit 1 in step 200, controller 23 determines, in step 220, whether the hibernation is to be performed due to a power-off operation. Controller 23 then performs the corresponding power reduction operation, and proceeds into the hibernation state.

When the driving of DBPS 4 is stopped due to a sudden power-off operation, SMPS interface unit 24 outputs a power-off signal POWER OFF to controller 23. In response to the power-off signal, controller 23 determines that the hibernation is performed due to a power-off operation, and accordingly generates a battery cut-off signal BATTERY OFF for output to DBPS 3, in step 230. In response to the battery cut-off signal BATTERY OFF, DBPS 3 interrupts the battery power, and SMPS 4 interrupts the battery power supplied to the system, in step 240.

Referring back to step 220, when it is determined that the hibernation is not to be performed due to a power-off operation, controller 23 generates a main power cut off signal AC OFF for output to DBPS 3 and SMPS 4, in step 250. In response to main power cut off signal AC OFF, SMPS 4 interrupts the supply of AC power (ie., the main power), and provides backup battery power from DBPS 3 to the system, in step 260.

As described above, the hibernation state is established by interrupting the main power supplied to the computer.

Referring back to step 170, if it is determined that the hibernation support mode is not set, CPU 11 generates the battery cut off signal BATTERY OFF for output to DBPS 3, in step 210. DBPS 3 then enters the power-off state by cutting off the power supplied from the battery in accordance with the battery cut off signal BATTERY OFF.

Figure 4A:
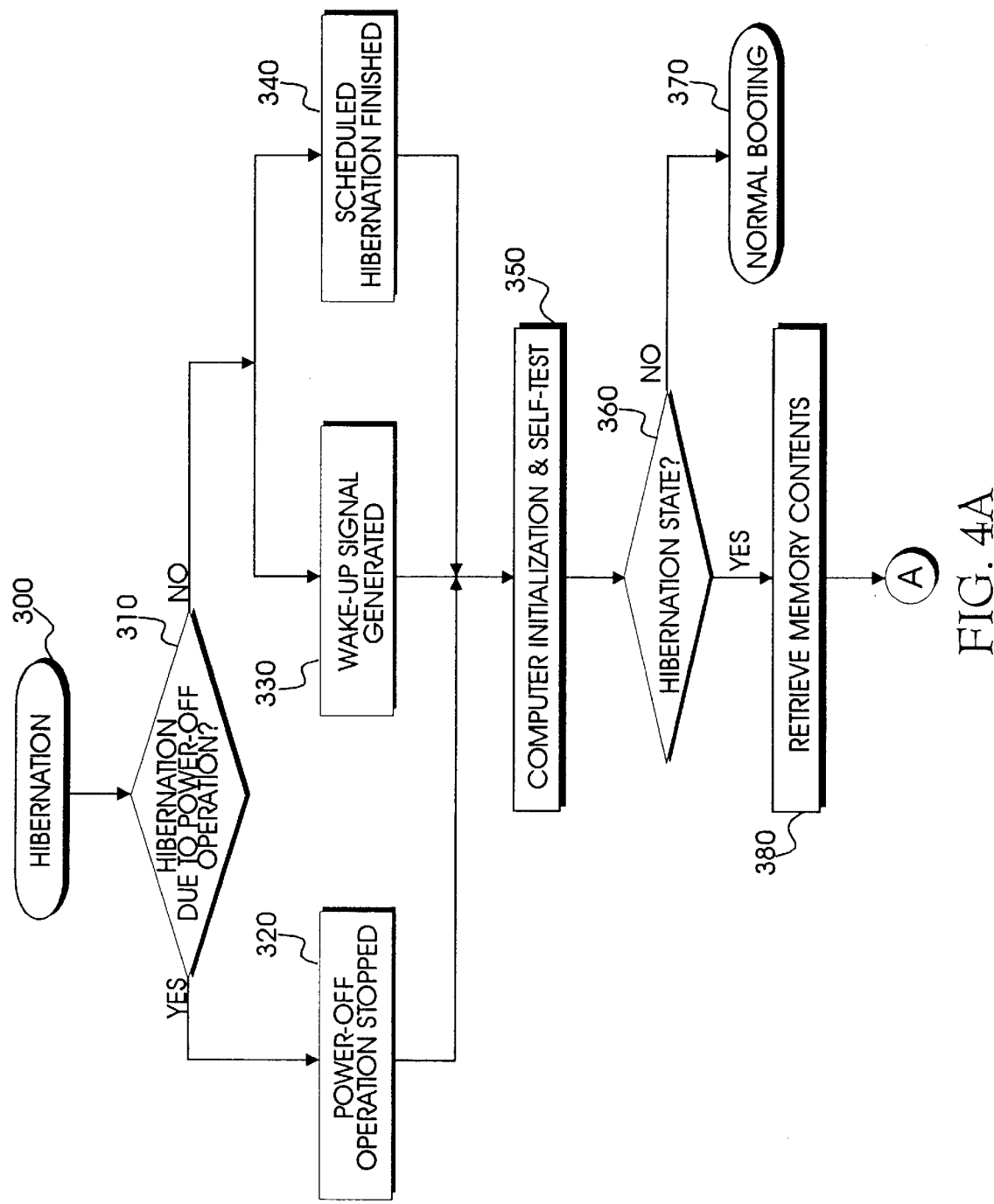
FIGS. 4A and 4B are operational flowcharts showing a resume process of the computer system performed according to a preferred embodiment of the present invention.
Figure 4B:
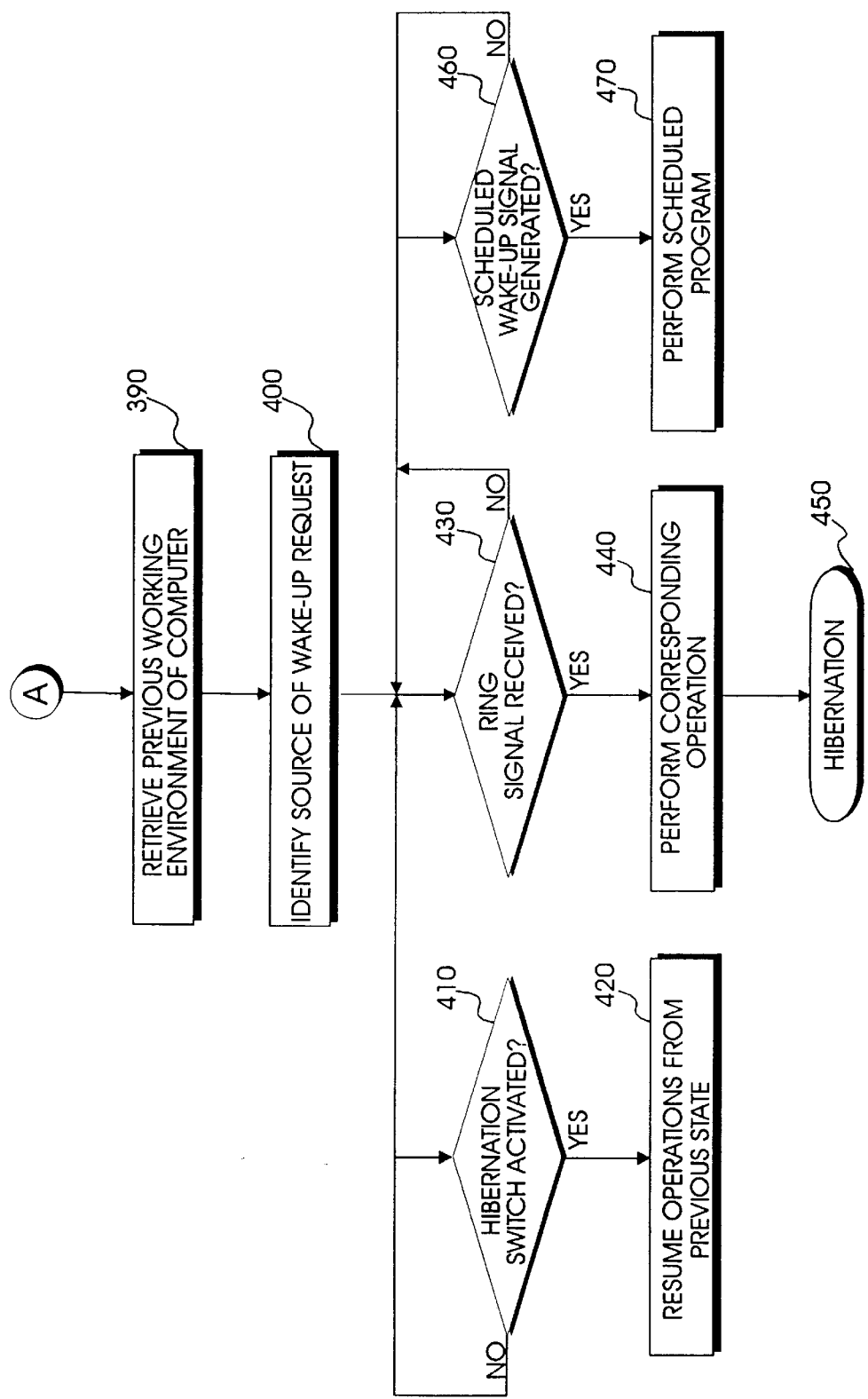

While in the hibernation state, a resume process can be performed according to the steps illustrated in FIGS. 4A–4B as follows. The computer is maintained in the hibernation state in step 300. The resume process advances from step 310 depending upon whether the hibernation state was established due to a power-off operation. If the current hibernation state is due to the power-off operation, SMPS 4 supplies the common power source to the system when the power-off operation is stopped in step 320.

Alternatively, if the current hibernation state is not due to the power-off operation, a WAKE-UP signal can be generated according to the operation of one of the WAKE-UP sources 26 and input to controller 23 through WAKE-UP source interface unit 25, in step 330. In response to the WAKE-UP signal, controller 23 compares the signal with a mask bit designated in an internal register (not shown), and outputs the power supply signal POWER ON to SMPS interface unit 24 when the WAKE-UP signal is an enabling signal. In other words, when a corresponding signal is output from, for example, a keyboard controller, WAKE-UP source interface unit 25 outputs the WAKE-UP signal in accordance with the key input. Controller 23 compares the WAKE-UP signal with the designated mask bit and outputs the power supply signal POWER ON when the input WAKE-UP signal is an enabling signal, and ignores the WAKE-UP signal when the it is not an enabling signal. The mask bit is information from the signal used to wake up the system from the hibernation state. When a ring signal of the facsimile or modem is transmitted, WAKE-UP source interface unit 25 outputs the corresponding WAKE-UP signal, and controller 23 accordingly outputs the power supply signal POWER ON when the signal compared with the designated mask bit is an enabling signal. Controller 23 also outputs the power supply signal POWER ON when the signal corresponding to operation of hibernation switch S1 is provided through input port 21.

Unlike the power supply resume process using the wake-up techniques described above, the timer installed within controller 23 counts the designated period of time that the computer is in the hibernation state, and outputs a corresponding signal to perform a scheduled wake-up operation in cases where the WAKE-UP signal is not generated before the designated period of time elapses. In these cases, controller 23 outputs the power supply signal POWER ON to SMPS interface unit 24 when the scheduled hibernation period is finished in step 340.

Each of the cases described above can be enabled or disabled by differentiating the WAKE-UP source that outputs the WAKE-UP signal in the hibernation state in the aforementioned manner.

SMPS 4 resumes the supply of power to the system when the power supply signal POWER ON is input through SMPS interface unit 24. Once power is supplied to the system, CPU 11 of host unit 1 performs the initialization and self-test in step 350. In step 360, CPU 11 determines whether the computer is currently in the hibernation state by checking a hibernation state flag stored in non-volatile memory 6.

CPU 11 performs a normal booting operation according to the supply of power, in step 370, when the flag of the hibernation state is set to the normal mode. Alternatively, CPU 11 retrieves the contents of all memories from auxiliary memory storage unit 5, in step 380, and stores the contents in RAM 13. Then, in step 390, CPU 11 retrieves the previous working environment of the computer.

After retrieving the working environment of the computer to the previous state, CPU 11 identifies the source of any wake-up request, in step 400.

That is, once CPU 11 outputs a command to determine the source requesting the wake-up operation and the corresponding address to PMS 2, host interface controlling unit 28 outputs a data input request signal to controller 23 according to the applied address. Controller 23 then reads the command provided through input port 21.

Controller 23 outputs data corresponding to the source requesting the wake-up operation in the hibernation state to the system bus through output port 22 in accordance with the command output from CPU 11. Accordingly, CPU 11 determines the source requesting the wake-up operation in accordance with wake-up source data provided from PMS 2.

When hibernation switch S1 is activated by the user in step 410, CPU 11 resumes performance of the operation being executed before the supply of power was interrupted, in step 420.

When a ring signal is received from a facsimile or modem in step 430, CPU 11 performs the operation corresponding to the received data, in step 440, and then returns to the hibernation state, in step 450. That is, when a ring signal from a facsimile or modem is transmitted, CPU 11 performs the operation in response to the ring signal, stores the working environment and data, and then returns to the hibernation state to thereby prevent unnecessary power consumption. When a scheduled WAKE-UP signal is generated in step 460 in accordance with the duration of the designated time period, CPU 11 performs the program in accordance with the scheduling in step 470.

While there have been illustrated and described what are considered to be preferred embodiments of the present invention relating to the process of performing a hibernation function of the computer, it is intended that the present invention not be limited to the particular embodiments described above. Moreover, the present invention can be applied to all digital systems.

In addition, each of the components of the present invention can be constructed as an integrated circuit in order to perform the aforementioned hibernation function.

According to the prefer-red embodiments of the present invention, data and commands can be transmitted between the host unit and the interface controller by additionally attaching an interface logic unit with the host of the system, thereby performing the operation corresponding to selectively masking the source requesting the hibernation.

What is claimed is:

1. A computer system, comprising:
   a host unit;
   a power management system;
   a data backup power supply;
   a switching mode power supply for supplying operating power to the computer system;
   an auxiliary memory storage unit; and
   a memory, wherein:

said power management system generates a hibernation signal when one of a hibernation switch is manually activated by a user, an event is not generated from peripheral devices of said computer system for a predetermined time period, a command word is generated by said host unit to perform a scheduled hibernation, and a battery driving signal is output from said data backup power supply due to a power-off operation;

said host unit stores a working environment and data in said auxiliary memory storage unit in response to said hibernation signal, and outputs a powerdown command word so that said power management system cuts off a supply of power to said computer system by outputting one of a main power cut-off signal and a battery power cut-off signal; and said host unit retrieves said working environment and data, identifies a source requesting a wake-up operation, and performs a corresponding operation, when said power management system resumes said supply of power to said computer system; and wherein said power management system comprises:
   a WAKE-UP source interface unit for outputting a WAKE-UP signal to wake up said computer system while said supply of power to said computer system is cut off;
   a controller for outputting said hibernation signal when one of said hibernation switch is manually activated by the user, said event is not generated from said peripheral devices of said computer system for said predetermined time period, said command word is generated to perform said scheduled hibernation, and said battery driving signal is output from said data backup power supply due to said power-off operation, said controller cutting off said supply of power to said computer system by outputting one of said main power cut-off signal and said battery power cut-off signal in response to said powerdown command word, and resuming said supply of power to said computer system by outputting a power supply signal in response to one of said WAKE-UP signal, activation of said hibernation switch and passage of a designated time period while said supply of power to said computer system is cut off; and
   an interface unit for transmitting data for controlling hibernation process of the computer system according to the command word transmitted between said controller and said host unit.

2. The computer system as claimed in claim 1, wherein said interface unit comprises:
   an address decoder for decoding an address output from said host unit and outputting a latch enabling signal and an output enabling signal;
   a host interface control unit for outputting a corresponding signal to control data transmission between said host unit and said controller according to said latch enabling signal;
   an input port for latching data output from said host unit according to said latch enabling signal; and
   an output port for outputting data and controlling signal output from said controller to a system bus according to said output enabling signal.

3. The computer system as claimed in claim 2, wherein said controller compares said WAKE-UP signal with a designated mask bit stored in an internal register of said controller when said WAKE-UP signal is output from said WAKE-UP source interface unit to determine whether said WAKE-UP signal is an enabling signal, said controller outputting a power driving signal when said WAKE-UP signal is said enabling signal and ignoring said WAKE-UP signal when said WAKE-UP signal is not said enabling signal.

4. The computer system as claimed in claim 2, wherein said power management system is comprised of an integrated circuit.

5. The computer system as claimed in claim 1, wherein said host unit checks a hibernation setup flag stored in said memory in response to output of said hibernation signal from said power management system to determine whether a hibernation support mode is set, and thereafter said host unit stores said working environment and data when said hibernation support mode is set, and outputs said battery power cut-off signal to said data backup power supply when said hibernation support mode is not set.

6. The computer system as claimed in claim 1, wherein said host unit checks a hibernation state flag stored in said memory when said supply of power is resumed to said computer system to determine whether a present state of said computer system corresponds to a hibernation state, and thereafter said host unit performs a normal booting process when said present state of said computer system does not correspond to said hibernation state, and retrieves said working environment and data when said present state of said computer system corresponds to said hibernation state.

7. The computer system as claimed in claim 1, wherein said host unit retrieves said working environment and data, and thereafter resumes operations from a state before said supply of power to said computer system was cut off when said source requesting said wake-up operation is said hibernation switch.

8. The computer system as claimed in claim 1, wherein said host unit retrieves said working environment and data, performs said corresponding operation according to a ring signal received from said source requesting said wake-up operation, and then stores said working environment and data after cutting off said supply of power to said computer system.

9. The computer system as claimed in claim 8, wherein said source requesting said wake-up operation comprises one of a facsimile and a modem.

10. The computer system as claimed in claim 1, wherein said host unit retrieves said working environment and data, and thereafter performs a scheduled program when said source requesting said wake-up operation outputs a WAKE-UP signal in accordance with passage of a designated time period.

11. A method for controlling power of a computer system, comprising the steps of:
generating a hibernation signal when one of a hibernation switch is manually activated by a user, an event is not generated from peripheral devices of said computer system for a predetermined time period, a command word is generated by a CPU (central processing unit) to perform a scheduled hibernation, and a battery driving signal is output from a data backup power supply due to a power-off operation;
checking a hibernation set-up flag to determine whether a hibernation support mode is set;
storing a current hardware condition and memory contents of said computer system when said hibernation support mode is set;
generating a powerdown command after storing said current hardware condition and memory contents of said computer system;
determining whether a hibernation state of said computer system is being activated due to said power-off operation;
generating a battery cut off signal and interrupting battery power when said hibernation state is being activated due to said power-off operation; and
generating a main power cut off signal, interrupting main power while providing said battery power when said hibernation state is not being activated due to said power-off operation.

12. The method as claimed in claim 11, further comprising a step of generating said battery cut off signal and interrupting said battery power when said hibernation support mode is not set.

* * * * *